United States Patent
Infantino

[11] 3,717,344
[45] Feb. 20, 1973

[54] BOWLING PIN WITH PLASTIC PROTECTIVE CLADDING

[75] Inventor: Joseph Rocco Infantino, Chappaqua, N.Y.

[73] Assignee: AMF Incorporated

[22] Filed: Nov. 3, 1970

[21] Appl. No.: 86,394

[52] U.S. Cl. ........273/82 R, 273/DIG. 3, 273/DIG. 4, 273/DIG. 8, 273/DIG. 9, 273/DIG. 12, 273/DIG. 29
[51] Int. Cl. .............................................. A63d 9/00
[58] Field of Search .......273/DIG. 3, DIG. 4, DIG. 8, 273/DIG. 11, DIG. 9, DIG. 12, DIG. 29, 82 R, 82 A, 82 B

[56] References Cited

UNITED STATES PATENTS

| | | | |
|---|---|---|---|
| 3,298,690 | 1/1967 | Berry et al. | 273/82 R |
| 3,520,969 | 7/1970 | Smith | 273/82 R X |
| 3,018,106 | 1/1962 | Satchell et al. | 273/82 R |
| 2,876,011 | 3/1959 | Hunt | 273/82 R |
| 3,220,731 | 11/1965 | Germino et al. | 273/82 R |
| 3,257,113 | 6/1966 | Medney | 273/82 R |

*Primary Examiner*—George J. Marlo
*Assistant Examiner*—Richard J. Apley
*Attorney*—George W. Price and Thomas M. Hammond

[57] ABSTRACT

A bowling pin having a preformed wood body or core encased in a plastic cladding, the cladding being a polyurethane and the pin having a de-adhering coating on the core, the bond strength of the coating to the core or to the polyurethane being less than the bond strength of the polyurethane to the core or the cohesion of the coating layer per se is less than the adhesion of the coating to the core or to the polyurethane.

1 Claim, 3 Drawing Figures

PATENTED FEB 20 1973　　　　　　　　　　　　　　　3,717,344
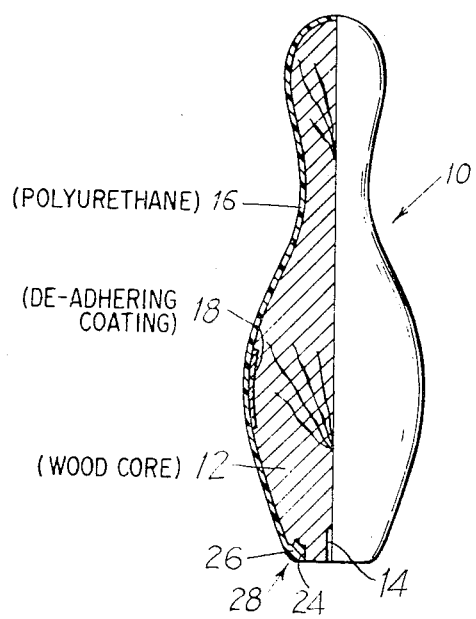
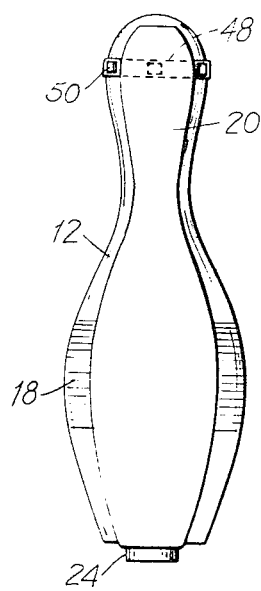
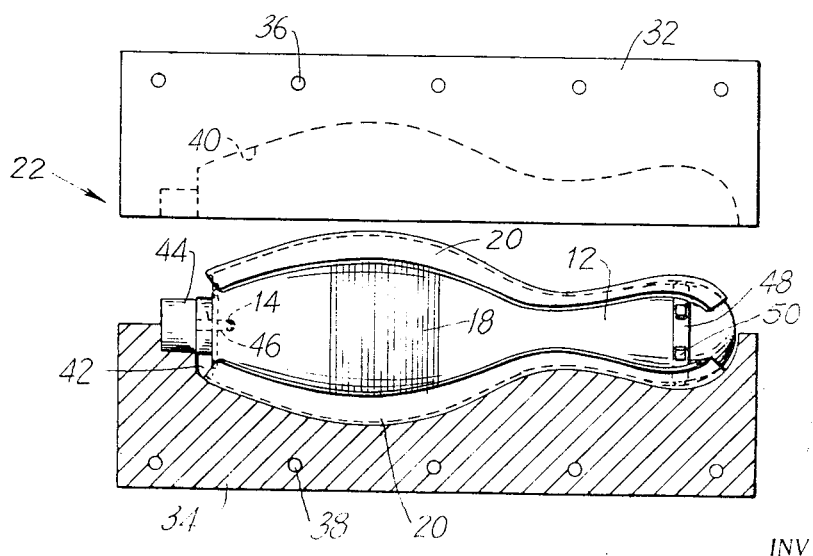
INVENTOR.
JOSEPH ROCCO INFANTINO
BY
ATTORNEY

BOWLING PIN WITH PLASTIC PROTECTIVE CLADDING

This invention relates to bowling pins and a method for making the same and more particularly to an improved bowling pin having wood body or core which is clad with a polyurethane plastic and having a de-adhering coating on the core or body, the bond strength of the coating to the core or the polyurethane being less than the bond strength of the polyurethane to the core or the cohesion of the coating layer per se is less than the adhesion of the coating to the core or to the polyurethane.

Generally, it has been conventional practice in manufacturing plastic coated bowling pins having wooden cores to apply to the wood core a plurality of layers of plastic coating until a sufficient depth has been provided. This procedure is time consuming, cumbersome, expensive and often results in plastic coating which delaminates from the pin core under rigorous impact when in actual use. In addition, it has also been conventional to apply primer coats of various types upon the wooden core before application of the plastic cladding to increase or enhance the bonding of the plastic cladding to the pin core. Although pins manufactured in accordance with the known procedures have more than met minimum commercial requirements, they still present certain disadvantages. This is especially so in regard to polyurethane clad bowling pins wherein the plastic is applied to a wooden core. For example, polyurethane clad bowling pins having wooden cores tend to grow preferentially in certain regions upon continued impact due to varying wood hardness. This growth is localized and manifests itself as bumps or blisters which not only caused decreased pin life and premature cracking of the plastic coat but also malfunctioning of automatic pinspotting devices, such as those generally in current use.

Studies have shown that the region of the pin at the periphery of the bumps or blisters exhibits especially good adhesion. In compression molding the polyurethane coating on the wood cores, the pressures and heat involved cause the coating to adhere tenaciously to the wood at the ball impact region. However, upon ball impact, the coating eventually loses adhesion nonuniformly. Generally, this is due to the variation in the wood grain of the core. When regions of good adhesion surround a region of poor adhesion, or wood delamination, a condition for blistering, is set up. This is so since in such a region the peripheral area is tightly bonded to the wood, whereas the center of the region is free to grow on impact. Consequently, repeated impact under conditions of use cause the formation of bumps or blisters and also leads to eventual cracking at the blister edges. There exists a need, therefore, to overcome these disadvantages and the present invention provides a bowling pin and a method for manufacturing the same which overcomes the mentioned disadvantages and fills this need.

It is an object of the present invention to provide a plastic coated bowling pin of increased durability.

It is a further object of the invention to provide a bowling pin having a preformed wood core encased in polyurethane cladding and having a de-adhering coating on the core wherein the bond strength of the coating to the core or the polyurethane is less than the bond strength of the polyurethane to the core or the cohesion of the coating layer per se is less than the adhesion of the coating to the core or to the polyurethane.

It is a further object of the invention to provide a method for making a bowling pin having a preformed wood core encased in polyurethane cladding and having a de-adhering coating on the core wherein the bond strength of the coating to the core or the polyurethane is less than the bond strength of the polyurethane to the core or the cohesion of the coating layer is less than the adhesion of the coating layer to the core or to the polyurethane.

Additional objects and advantages of the present invention will become apparent from the following description which is to be taken in conjunction with the accompanying drawing wherein:

FIG. 1 is a view, partially in section, of a bowling pin in accordance with the invention and in which the wood core is coated with a de-adhering coating in the ball impact region and a plastic cladding of polyurethane resin and having an integrally formed base;

FIG. 2 is an elevational view showing a mold which may be employed to support the pin core which is coated with the de-adhering coating in the ball impact region and having polyurethane plastic preforms positioned thereon and wherein the plastic flows over the core to encase the bowling pin in a polyurethane composition; and FIG. 3 illustrates the pin configuration and approximate dimension of a partially cured polyurethane preform relative to the bowling pin core coated in the ball impact region with a de-adhering coating as used in a preferred method of manufacturing a bowling pin in accordance with the invention.

Referring now more particularly to FIG. 1, there is illustrated there a bowling pin in accordance with the invention and generally designated by numeral 10. Pin 10 comprises a wood body or core 12 of maple or other suitable hard wood, which may also have a conventional dowel support recess 14. The core is encased in accordance with the invention with a cladding or cover of polyurethane 16. Disposed between the polyurethane cladding 16 and the body or core 12 is a de-adhering coating 18 located preferably around the ball-to-pin contact region extending to about 2 inches above and 1.5 inches below this area, although it may be applied to the entire core surface.

Although a bowling pin in accordance with the invention may be prepared by a wide variety of processes, a preferred technique which results in excellent products involves the preparation of a polyurethane preform 20 generally of a contour such as shown in FIG. 3, two of which are suitably secured to the core or body 12. In the illustrated embodiment, two preforms 20 on opposite sides of the core 12 have been found to give eminently satisfactory results. It is to be understood, however, that any suitable number of preforms could be used, if desired, depending on size and thickness. Preforms 20 exhibit such thickness that they adhere to the body or core 12 which has been coated with the de-adhering 18 when pressed against the coated core. The coated core and preforms, as assembled, are then placed in a mold 22 and molded under heat and pressure until the preforms of polyurethane flow around the core to produce an essentially uniform layer or cladding over the entire peripheral or surface area of the coated core.

In the preferred method for manufacturing of bowling pins in accordance with the invention the polyurethane surface layer or cladding 16 is molded directly on the coated core and attaches thereto with great affinity. Except for some flash, which may occur in molding, each pin removed from the mold usually has a smooth, glossy and attractive appearance. Insignia and neckbands may then be applied in order to complete the preparation of the pin for commercial utilization.

As mentioned hereinabove and as shown in FIG. 1 of the drawing, the body or core 12 is provided with a recess 24 at its butt or base end. After the polyurethane flows, during the molding operation, an extra thickness or bead 26 is formed. The polyurethane adheres to the coated core and conforms exactly to the contour of the recess 24. Integral base 28 which is formed reinforces the base of the pin, resulting in reduction of core damage which is usually brought about due to conventional groovings in pin bases, such as required for effectively seating separate bases. The construction embodying such an integral base reduces the manufacturing costs because it eliminates several machining and assembling operations. It also increases durability of the base and, therefore, most important, the service life of the pin.

The preparation of polyurethane compositions useful to clad wood cores in accordance with the invention usually involves a two-step process in which the polyol is heated with an excess of an organic polyfunctional, i.e., a di-, or tri-, isocyanate and then mixed and reacted with a suitable diamine such as 4,4'methylene bis (2 chloroaniline), available commercially as MOCA; or methylene dianiline, for example.

Of various polyols, which may be used in the reaction with the polyfunctional organic isocyanates, e.g., diisocyanates, so as to prepare the isocyanate-terminated polymer, the polyalkylene ether glycols are preferred. These glycols have the general formula:

$$HO—C_nH_{2n}—(O—C_nH_{2n})_xOH$$

wherein the value of $x$ is such as to give a molecular weight less than about 8,000 when reacted with the isocyanate to form the polyurethane prepolymer, and n is an integer having a value of at least 2 and not greater than 8.

When $C_nH_{2n}$ is $C_2H_4$, the polyol may be considered as a derivative of ethylene oxide or ethylene glycol. When $C_nH_{2n}$ is

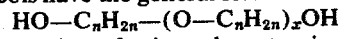

the polyol can be considered as a derivative of propylene oxide or propylene glycol. When $C_nH_{2n}$ is $C_4H_8$, the polyurethanes comprise those available commercially from E. I. du Pont as Adiprenes. These polymers may be considered derivatives of 1,4 butanediol, HO—(CH$_2$)$_4$OH, or of tetrahydrofurane

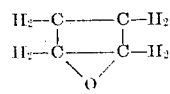

Where polyether polyols of the general formula: HO—C$_4$H$_8$—(O—C$_4$H$_8$)$_x$OH are reacted to various degrees with tolylene diisocyanate TDI in excess, products of varying molecular weights are derived. Three polyurethanes, i.e., polytetramethylene ether glycols of excellent properties may be characterized within the general formula by the following data:

| Wgt. percent free NCO | Approx. Mol. Wgt. |
|---|---|
| 4 | 3,000 |
| 6 | 1,500 |
| 9 | 850 |

In accordance with the present invention, the preferred polyalkylene ether glycol is the addition product of tetramethyleneglycol having a molecular weight of at least 500 and a free NCO percentage of at least 4 percent. This is a simple product formed from a relatively few molecules but the polyol may be the inter-reaction product from many molecules. Where propylene oxide is used, for example, a branched chain is obtained.

The fundamental polyol unit need not be a simple glycol with adjacent hydroxyls but may be a diol where the hydroxyls are not adjacent as in the following: HO—(CH$_2$)$_4$OH. The simplest polyether polyol from this base is: HO—(CH$_2$)$_4$—O—(CH$_2$)$_4$OH. Also there may be other than four methylene groups and the polyether polyol may be of a more complex type represented by a condensation product of two or more different polyols (or polyols and ethylene oxide type compounds). Examples are hexane triol and propylene oxide or hexane triol, pentane diol and propylene oxide. Many isomers and mixtures may be in the product. Suitable polyols, for example, are disclosed in U.S. Pat. Nos. 2,901,467 and 2,917,489.

The isocyanates employed in synthesizing the polyurethanes may be aliphatic or aromatic. The most common aliphatic diisocyanate is diphenyl-methane diisocyanate, commonly known as MDI. The most commonly used aromatic diisocyanate is tolylene diisocyanate, popularly known as toluene diisocyanate or TDI. This name is used to include the isomers and mixtures of isomers of tolylene diisocyanate. The most commonly used of all diisocyanates is the TDI 80–20 mixture of 2,4-tolylene diisocyanate and 2,6-tolylene diisocyanate. Each NCO radical in these compounds may react in any one of various fashions. Due to the reactions possible, the large molecules formed will have multiple cross-links; the more numerous these are, in general, the more rigid and hard the final polymer will be; the less numerous, the softer and more flexible the polymer will be. The reaction to form a macromolecule provides a thermosetting polymer. In general, these can be post-formed by the application of heat and pressure, so that these materials, in fact, are thermoplastic thermosets. During the forming operation, the partially cured preform is further cured but not necessarily to completion. Thereafter, the product can be virtually post-cured by heating in a tunnel or allowing it to stand at room temperature for several weeks. Usually normal periods of storage prior to delivery are sufficient to complete the cure.

Although reactions go to virtual completion, it should be noted that they are reversible, so that new equilibria can be established with changes in properties. Extreme sensitivity to moisture of some polyurethane polymers is an example of this. As a class, there is a sensitivity to oxidative reactions; in general, otherwise, chemical and solvent resistance is good.

Representative of the typical organic isocyanates which may be used in preparing the novel cladding compositions of the present invention, there may mentioned m-phenylene diisocynate, toluene-2,4-diisocyanate, hexamethylene-1,6-diisocyanate, tetramethylene -1,4-diisocyanate, cyclohexane-1,4-diisoctanate, naphthylene-1,5-diisocyanate, 1-methoxyphenyl 1,2,4-diisocyanate, methylene-bis (4-phenylisocyanate), 4,4'- biphenylene diisocyanate. Mixtures of toluene-2,4- and 2,6-diisocyanate may be used. In general, the diisocyanates having the isocyanate groups substituted on aromatic rings are preferred. From about 4.0 to 11.0 molar proportions of organic diisocyanate reactant is generally employed. Other polyfunctional isocyanates may also be used such as the tri-isocyanates, e.g., toluene triisocyanates, alone or admixed with one or more diisocyanates. In this regard, see for example U.S. Pat. No. 2,531,392.

The de-adhering coating components suitable for use in the practice of this invention are commercially available. Generally, they comprise materials in which the bond strength of the coating to the core or to the polyurethane is less than the bond strength of the polyurethane to the core or the cohesion of the coating layer per se is less than the adhesion of the coating to the core or to the polyurethane. Consequently, adhesion between the polyurethane cladding and the core is decreased to a substantially uniform level by coating the core with such de-adhering products. These materials include a wide variety of products, some of them being film formers, such as, for example, cellulosics, thermosetting resins, polyalkylene and polyester films and tapes and the like.

Examples of cellulosics suitable for de-adhering coatings in the practice of the invention are cellulose nitrate, cellulose acetate, cellulose acetate-butrate, ethyl cellulose, cellulose propionate and other cellulosic ethers and esters.

Examples of thermosetting resins are fully cured epoxy resins, polyurethanes and silicone resins. Exemplative of polyalkylene and polyester films and tapes which may be applied as de-adhering coatings are films and tapes of polyethylene, polypropylene and polyesters generally. In addition, other film formers such as polyvinyl, alcohols and lecithins may also be utilized.

In addition to the film formers, powdered lubricious solids, applied as dusts or from liquid dispersions, may also be utilized as de-adhering pin coatings in carrying out the practice of the invention. Examples of such materials are fluorocarbons, talcs, stearates, graphite and powdered polyethylenes. Various oils and waxes are also suitable as de-adhering coatings. These include silicone oils, such as dimethyl silicone, paraffins, polyethylene glycols having molecular weights above about 2,000, natural waxes, such as carnauba wax and montan, as well as fatty acids, such as stearic acid and the like.

Suitable de-adhering coatings of the epoxy resin type include a wide variety of materials in the class of resins referred to as epoxy resins. Any of the various compounds known as epoxy resins such as the compositions described in U. S. Pat. No. 2,633,458, may be used in their fully cured state. Epoxides are manufactured chiefly by the reaction of epichlorohydrin with bisphenol A. Epoxidized novolacs (condensate of phenol with an aldehyde) may also be used and are available commercially. Epoxy resins also may be manufactured by known processes employing peracetic acid. Generally, the epoxides contemplated as de-adhering coatings are those of the general formula:

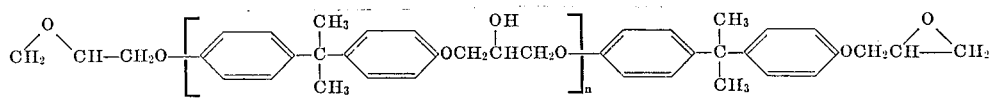

wherein $n$ has a value of from 0 to 7. Those in which $n$ has a value greater than 7 have increasing viscosity and consequently a diminishing coefficient of impregnation. Expressed alternately, suitable epoxy resins are fully cured epoxy resins which have been defined as polyesters containing a highly reactive epoxy or oxirane group at each terminal separated by an alternating aromatic and aliphatic system containing hydroxyl groups, are not included by air, have long storage life and cure hard. The epoxy resins are generally hardened or solidified by a variety of curing agents such as various amides, amines, acids, or by another resin for example. Curing agents and amount of each type used are well known, see, for example, Columns 10 and 11 of U. S. Pat. No. 2,872,427. In using the epoxy resin as a de-adhering coating, a solvent or non-solvent vehicle may be used. The ratio of curing agent to epoxy preferably varies between 2–25 parts per hundred parts of resin although amounts generally in the range of 0.5 percent to 30 percent may be employed.

Illustrative examples of suitable curing agents within the above categories are materials such as: primary and secondary aliphatic amines, e.g., diethylenetriamine, ethylenediamine, triethylenetetramine, tetraethylenepentamine; hydroxyaliphatic amines, e.g., N-(hydroxyethyl) diethylenetriamine and N,N'-bis (hydroxyethyl) diethylenetriamine; polyalkylene polyamines; acrylonitrile-acrylamide copolymers; acrylonitrile-amine adducts, e.g., cyanoethyl-diethylenetriamine; aliphatic amine adducts, e.g., an adduct of liquid epoxy resin with an excess of polyamine such as the product Shell Development Co., available as curing agent "U"; phenyl tertiary amines, e.g., tri-(dimethylaminomethyl) phenol; acid anhydrides, e.g., dodecylsuccinic anhydride and methyl "Nadic" anhydride in the presence of a tertiary amine catalyst such as benzyldimethylamine; boron trifluoride complexes. e.g., the complex formed by neutralizing $BF_3$ with an amine which provides a mixture which is stable for long periods of time at room temperature and will cure in 4–6 hours at about 110°C. Reactive flexibilizing agents are used to eliminate brittleness in some epoxy-amine or epoxy-anhydride systems. In referring to flexibilizing agent for the de-adhering coating this means that the coating after curing is in a state of increased toughness as distinguished from brittleness. The property of flexibilized resin is such that it has an impact resistance that prevents the wood substrate coated therewith from shattering under concussive forces. For this purpose, polysulfide rubbers in combination with an amine may be used. Various commercially available polyamide resins such as those containing amide groups in the polymer structure with or without one or more additional modifying groups such as, amino, cyano, and hydroxy units may effectively be used to function both as curing agent and as flexibilizing agent.

Various aliphatic epoxies such as a diepoxide in which the two aromatic members are bridged by a long aliphatic chain, e.g., eight to 18 carbon atoms, may also be used as flexibilizers. Aliphatic amines and alkyl diamines, e.g., t-butylamine, hexamethylene-diamine, etc. may also be employed.

Particularly suitable polyurethane materials useful as de-adhering pin coatings are those polyurethanes disclosed more fully hereinabove. These polyurethanes do not have any great adhesive bonds with each other when one polyurethane is fully cured. Consequently, a layer of polyurethane as a de-adhering coating is useful in carrying out the practice of the invention when it is fully cured.

Particularly useful silicone resins or materials are polysiloxanes having the general structure:

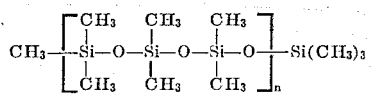

wherein $n$ is an integer from 2 to about 100 and greater. In addition, hydroxy substituted polysiloxanes having the general formula

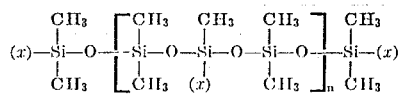

wherein $x$ is selected from the group consisting of methyl radicals and hydroxyl radicals and $n$ is an integer from 2 to about 40 and greater are also useful in carrying out the practice of the invention as de-adhering coatings. In regard to these hydroxy substituted materials, which are mono-, di-, and tri- hydroxy substituted, they are generally employed in the presence of an alkali metal salt of a lower organic acid such as acetic acid, propionic acid, butyric acid and the like. In the presence of atmospheric moisture, the acid salts activate the silanol groups to form a cross-linked network having

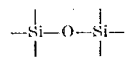

linkages by the two or more polysiloxane chains. Obviously, in such a case, the remaining bonds on the silicone will contain organic substituant groups depending upon the particular substitutant group on the polysiloxanes which are being cross-linked.

Generally, in employing the polysiloxanes or any of the other materials disclosed as suitable as de-adhering pin coatings in carrying out the practice of the present invention they are normally utilized by dispersing in a suitable carrier or vehicle. The vehicle is generally an organic compound such as petroleum naphtha, trichloroethylene and other suitable organic dispersants. The dispersion of the polysiloxanes in the organic carrier may vary widely but as a practical manner is generally in a range from about 1 to about 30 percent by weight, based on the total weight of the dispersion. Moreover, where the hydroxy substituted polysiloxanes are used, the alkali metal salt of the lower organic acids mentioned above is employed in a range of from about 0.01 to about 0.20 percent by weight, based on the total weight of the dispersion.

Where true films and tapes are employed as de-adhering pin coatings such as the polymeric ethylenes, propylenes, and esters mentioned above they generally have an average molecular weight in a range from about 10,000 to about 150,000 or more determined by ASTM method D-1601-58T. Such is also true of the polyvinyl alcohols. The polyvinyl alcohols are generally employed in suitable vehicles in amounts mentioned above. On the other hand, the films and tapes are generally wrapped around the pin core.

In regard to the lecithin types of materials, they are generally phosphatide compounds prepared by reacting a polyhydric alcohol by an esterification process using a fatty acid and phosphoric acid to form the ester and then in turn combining the esterified polyhydric alcohol with a nitrogen containing compound such as betaine or ethanolamine. The procedures for preparing the lecithin type compound are those generally known in the art and the compounds have the following general formula:

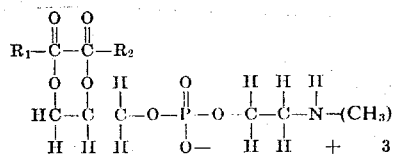

wherein $R_1$ and $R_2$ are selected from the groups consisting of hydrogen, methyl radical and ethyl radicals or combinations thereof. In a preferred structure employed in the practice of the present invention, $R_1$ and $R_2$ are hydrogen. In employing the lecithin type compounds in the practice of the present invention, they, like the materials mentioned above, are generally utilized with a suitable carrier. Examples of suitable carriers are water, chloroform and benzene, although other suitable carriers or vehicles may be employed, since the material need not be dissolved, but only dispersed in such a vehicle. Moreover, the lecithin is generally utilized in an amount of about 0.5 to about 40 percent by weight in the vehicle based on the total weight thereof.

Particularly useful fluorocarbons suitable as de-adhering coatings are those having the following structures

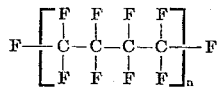

wherein n is an integer from about 30 to about 500 or greater and those having the formula

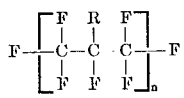

wherein n is an integer from about 20 to about 400 or greater and is selected from the group consisting of hydrogen, chlorine, methyl radicals and $CF_3-$. Generally, trifluorocarbons are used as dusts or dispersed in suitable carriers such as naphtha in about 3 to 30 percent by weight dispersion, based on the total weight of the dispersion.

Stearates suitable for use in the present invention include the alkali metal stearates potassium, sodium and calcium stearates and metallic stearates such as zinc stearate, aluminum stearate and the like. On the other hand where fatty acids are employed stearic acid is a preferred material although generally fatty acids containing from about $C_{12}$ to $C_{25}$ are useful as de-adhering pin coatings. These materials are used in a suitable carrier or vehicle in practicing the invention.

Generally speaking, in carrying out the practice of the invention, as mentioned hereinabove, the de-adhering pin coatings can cover completely the entire wooden core of a bowling pin. On the other hand, it is generally preferred that the de-adhering pin coatings be utilized in relatively minor amounts so that they substantially and completely penetrate the wood core, having no measureable thickness, although as a practical matter the de-adhering pin coatings can be anywhere from about 1 mil to as much as 20 mils in thickness. In addition, although these coatings can be employed to cover the entire pin core, they are generally utilized to cover only that portion of the core in the vicinity of the ball-to-pin impact region. In application of a de-adhering pin coat, therefore, the coating is generally applied to the core in an area extending upwardly from about the ball impact region to about 2 inches above the point of contact and about 1½ inches below the point of contact of the ball with the pin.

As mentioned hereinabove, the materials employed as de-adhering pin coatings in the practice of this invention are generally utilized in a vehicle or carrier. Any suitable vehicle or carrier can be used. However, the vehicle or carrier is generally an organic material such as toluene, xylene, benzene, aliphatic naphtha, hexane, octane and other similar materials. Additional carriers which can be employed are petroleum naphtha, trichloroethylene, water and chloroform. Numerous other materials which are known to be useful as vehicles may also be used as carriers. The particular carrier for use with any one material is readily determinable. It is preferred, however, that the carrier be a relatively volatile material so that it can be disposed of by drying after the de-adhering coating is applied to a pin core. Moreover, the carrier may be a solvent or non-solvent, that is, a dispersant for the particular de-adhering coating material being utilized. Generally, the de-adhering coating material is employed in a range of about 0.5 to about 50 percent by weight in a suitable carrier based on the total weight of the carrier material. Preferably, however, it is employed in amounts of from about 1 to about 40 percent by weight. It is to be noted, moreover, that the de-adhering coating material is most preferably employed in relatively small amounts in the vehicle or carrier, that is, in a range of about 1 to 10 percent by weight based on the total weight of the carrier.

In connection with the polyurethane cladding, although a cladding of a thickness of about 50 mils is generally preferred as a practical matter, the bowling pins of this invention can have a coating of a thickness in a range from about 20 mils to about 200 mils.

In manufacturing a bowling pin in accordance with the invention, a preferred method is to apply the de-adhering pin coatings to the wood core and thereafter apply the polyurethane cladding to the core by utilizing appropriate molding apparatus. The de-adhering pin coating may be applied by brushing, spraying, pouring, wiping or dipping the pin core in an appropriate dispersion of the coat material. Generally, a core so coated is then dried with heat or simply permitted to dry at room temperatures for a period generally ranging from about 10 minutes to about 2 hours or until dry. In those cases where a curing-type of system is being utilized as a de-adhering pin coating, the coated core may be held overnight to permit curing to become complete. The core having the de-adhering pin coating thereon is thereafter completed by cladding it with the polyurethane material. In application of the polyurethane, a cladding of the plastic is first prepared as a preform which is applied to the core and subsequently molded in suitable molding apparatus so that the plastic comprising the preform flows and encases the core.

One particularly useful apparatus for molding the preformed composition over the pin core and which is illustrative only is shown in FIG. 2 of the drawing. The mold 22, as shown, comprises mold halves 32 and 34 which may be suitably equipped with heating elements 36 and 38. As an alternative, in order to provide the required heat, the molds may be placed between heated platens. In order to keep the core centered in the mold recesses 40 and 42 of the mold halves, respectively, a centering block 44 having a pin 46 is provided. Pin 46 extends into dowel support recess 14 in the pin core and is conveniently arranged to form the base and to be accommodated by the mold, being securely held therein. As an aid in assuring more precise and prompt centering of the core in the mold, a ring or band 48, provided with outwardly extending projections 50 of sufficient thickness to center the heated end of the core, is affixed to the pin core. Heated or separated patch spacers (not shown) of suitable thickness to serve the same purpose may be intermittently attached to the pin head before the core with the preforms as a unit is introduced into the mold. The band (or spacers) preferably comprise a composition which is the same or similar to the polyurethane utilized for the preforms from which the protective surface layer is formed. Consequently, upon molding and curing, the band blends into the plastic cladding and becomes an integral part thereof. Moreover, it is to be understood that it may be desirable depending on the mold and its position and the rigidity of the pin core holding means, to form the band (or spacers) of a composition which is wholly compatible with but melts at a higher temperature than the polyurethane preforms or it may be the same composition at a different curing stage.

In connection with the nature of the bond forces in utilizing a de-adhering pin coating in accordance with the invention, it is to be noted that the average bond peel strength of polyurethane to wood is in a range from about 14 to 24 lbs. of inch width of polyurethane cladding. In contrast to this, the average bond peel strength of polyurethane in a bowling pin utilizing the de-adhering pin coatings disclosed hereinabove is in a range of from about 2 to 18 lbs. per inch width of polyurethane cladding. The average bond peel strength is determined by cutting an area of the plastic cladding about 1 inch wide by approximately 4 to 6 inches long on sets of five pins and then pulling this off perpendicular to the surface by the application of increasing weights and calculating the average range.

The following illustrative examples are provided in order that the invention may be better understood. The examples being illustrative should not be interpreted as indicative of limitation on compounds or conditions stated. In the examples, unless otherwise stated, all parts and percents are by weight and a polyurethane cladding of 50 mils thickness is applied to the pin core.

EXAMPLE I

In a suitable apparatus equipped for mixing, two solutions, (I) and (II), to prepare the polyurethane preforms were mixed at room temperature and deposited in preform molds having a recess corresponding essentially to the lengthwise shadow of the pin and having a depth of approximately 150 mils. The mixture is used in approximately stoichiometric proportions, i.e., about 100 parts by weight of solution (I) and about 86.5 parts by weight of solution (II).

| Solution (I) is composed of: | % by weight |
|---|---|
| Adiprene LD–315[1] | 70 |
| Methylethyl ketone | 30 |
| Solution (II) is composed of: | |
| Methylene dianiline | 15 |
| Mesityl oxide | 85 |

[1]Polyurethane of E. I. du Pont Nemours having 9 percent by weight free NCO and a molecular weight of approximately 850.

The molded preforms 20 having the general shape shown in FIG. 3 were partially dried to allow for some evaporation of the solvent and then partially cured for about 1 hour at a temperature of about 95° C. (203°F.) and then removed from the mold.

Two of the preforms which are pliable and assume the contour of the bowling pin core when pressed against it, were applied to each of a set of five maple bowling pin cores which were centered in a mold as shown and described in connection with FIG. 2 and heat and pressure were applied, i.e., by heating in molds for 6–8 minutes at 100°C. (212°F.) until the preform composition flows and forms a uniform envelope on the cores. The clad cores were removed from the molds. They were then subjected to additional treatment which converts them into completed pins. The cure was continued subsequently after the additional treatment by passing through an oven at 65°C. (149°F.) for 40–90 minutes or by storage for several weeks at moderate temperatures. The bowling pins so prepared had an average bond peel strength of 14–24 lbs. per inch width.

The above procedure was repeated on another set of five pins except that a 3 percent dispersion in naphtha of porticulate polytetrafluoroethylene of average particle size of 1–5 microns and having an average molecular weight of 50,000 according to the manufacturers specifications was applied to the pin cores by dipping the cores in the dispersion to the ball-to-pin impact region to provide deadhering pin coatings. The coatings were dried at 72° to 74°F. for 1 hour to eliminate the naphtha. Thereafter, the molded preforms were positioned on the cores as stated above and molding was carried out by subjecting the cores to 400 psig and held in the molds for 7½ minutes at 230°F. After marking and topcoating, the pins were aged at room temperature about 70°F. for 21 days prior to testing. Upon testing, the pins had an average bond peel strength of 4–8 lbs. per inch width. In addition, the degree of release of the polyurethane cladding after 500 lines of actual bowling was about 90 percent of the ball impact area. Moreover, the pins manifested essentially no blistering even after 2,500 lines of bowling use. In contrast, the pins which contained no de-adhering coatings showed only an 18 percent degree of release of the polyurethane coating at the ball impact area and blistering occurred after 1,000 lines of play.

EXAMPLE II

A two-part system was mixed in suitable equipment and introduced into the preform molds. The formulation involved a polyurethane modified with an epoxy.

| Solution I: | Parts by weight |
|---|---|
| Adiprene LD–167[2] | 40 |
| MOCA[3] | 34 |
| Epon 815[4] | 60 |

[2]Polyurethane of E. I. duPont Nemours Co. having 6 percent by weight NCO and a molecular weight of approximately 1500.
[3]4.4′ methylene bis (2-chloraniline).
[4]Shell Chemical Company liquid epoxy resin containing butyl glycidyl ether as reactive diluent.

The polyurethane and epoxy are mixed at room temperature and the MOCA at 100°C. (212°F.) is added. The temperature of the mix is approximately 50°C. (122°F.). The preforms are molded and cured for 40–90 minutes at approximately 120°C. (250°F.). The preform composition was applied to a set of five cores as shown in FIG. 2, which thereafter were placed in molds (at same temperature and time) and cured at a temperature of approximately 127°C. (260°F.) for approximately 4 hours. The above procedure was repeated on an additional set of five cores except that a 5% solution of hydro lecithin inmethylene chloride was applied by brushing to the ball-to-pin impact region of the wood cores. The coatings were dried for 10 minutes after which a second coat was brushed on the cores and the coated cores were dried for an additional 30 minutes at 72°F. Molding was carried out as in the preceding example with subsequent marking and topcoating and aging of the pin.

The average bond peel strength of the polyurethane to the wood cores was 18–24 lbs. per inch width. In contrast, the pins having the de-adhering coatings had a bond peel strength of 2–7 lbs. per inch width. The degree of coating release after 500 lines of actual bowling use for the pins having the de-adhering pin coatings was 95 percent of the ball impact area, in contrast to the pin having no de-adhering coatings which showed a coating release of 18 percent of the ball impact area. Moreover, the pins with the deadhering coatings manifested essentially no blistering even after 2,500 lines of play in contrast to the pins not having the de-adhering pin coatings which became blistered after 1,200 lines of play.

EXAMPLE III

The procedure of Example I was repeated using instead the following two-part composition:

|  | Percent by weight | Temperature |
|---|---|---|
| Solution I: | | |
| Adiprene LD–213 | 95) | |
| | ) | 185°F. (85°C.) |
| TiO$_2$ pigment | 5) | |
| Solution II, molten MOCA | 25 | 250°F. (121°C.) |

Solutions I and II were mixed and poured into a mold and formed into preforms 20 which weight 90–100 grams. The preforms were aged in the molds at room temperature for 40–60 minutes. After the preforms were applied, as in Example I, to a set of five bowling pin cores, the pin cores with preforms 20 adhering thereto were placed in molds, preheated for 60–75 seconds at 230°F. (110°C.) and partially cured for 6–10 minutes at 230°F. (110°C.) to a point where the molded pins could be removed from the molds and handled. The procedure was repeated except that a 4 percent dispersion of a hydroxy substituted polysiloxane having an average molecular weight of about 4,000 calculated by known intrinsic viscosity methods and containing 1.5 percent of sodium acetate by weight, based on the total weight of the polysiloxane in naphthatrichloroethylene blend (50:50) was sprayed on the ball-to-pin impact region of a set of five pin cores. The coated cores were permitted to stand at 68°through 74°F. for 16 hours and subsequently molded as in the prior examples after which marking, topcoating and aging was carried out as in the prior examples.

The average bond peel strength of the pins having the de-adhering coating was 2 to 4 lbs. per inch width in contrast to the pins which contained no de-adhering coatings which had an average bond peel strength of 14 through 24 lbs. per inch width. Moreover, the degree of coating release after 500 lines of bowling use on those pins having the deadhering pin coatings was 100 percent of the ball impact area in contrast to 18 percent of the ball impact area on those pins which had no de-adhering coatings. In addition, the pins having the de-adhering coatings showed no evidence of blistering after up to 2,500 lines of use, whereas blisters occurred in the pins which did not employ the de-adhering coatings after 1,000 to 2,000 lines of play.

EXAMPLE IV

The procedure of Example I was repeated using the following two-part composition:

| Formulation of the two-part mix is: | Parts by weight |
|---|---|
| Adiprene LD–315 (100°C.) | 100 |
| MOCA (100°C.) | 25–30 |

The mix was charged into the preformed mold cavity at approximately 85°C. (185°F.) and held for 40 to 60 minutes at room temperature. Two of the preforms are thereafter placed on a set of five wood cores which were positioned in molds, the molds were closed in a hydraulic press providing 12–20 tons pressure for 7–10 minutes at 100°C. (230°F.). Molds with heated platens were used. Cure was then effected by heat for 40 minutes at 63°C. (145°F.). The procedure was again repeated on another set of five pin cores except that nitrocellulose was sprayed on the pin cores before application of the polyurethane coating. The nitrocellulose pins had an average bond peel strength of 9 to 11 lbs. per inch width in contrast to the polyurethane coated pins having no d-adhering coatings which had an average 14 to 24 lbs. per inch width bond peel strength. In addition, the degree of coating release after 500 lines of actual bowling use was 33 percent of the ball impact area on the pins containing nitrocellulose in contrast to 18 percent of the ball impact area on the pins which did not contain the coating release agent. Moreover, no evidence of blistering was noticeable after 2,500 lines of use on the nitrocellulose coated pins, whereas the pins containing no de-adhering coating had distinct evidence of blistering around the ball impact region after 1,000 to 2,000 lines of play.

Like results are obtained when any of the materials disclosed hereinabove are employed as de-adhering coatings.

The bowling pin of the present invention exhibits many advances as does the process for the manufacture thereof. For example, bowling pins prepared in accordance with this invention have excellent longevity in actual play. They may be manufactured on known equipment and with chemical constituents readily available commercially. Moreover, a bowling pin according to the invention can be manufactured without any substantial increase in costs. Numerous other advantages will be readily available to those skilled in the art.

It will be apparent to those skilled in the art that various modifications may be made in the product and in carrying out the process of this invention without departing from the spirit and scope of the invention. Accordingly, the invention is not to be limited except as defined in the appended claims.

What is claimed is:

1. A bowling pin comprising a preformed wood core encased in a polyurethane protective cladding and having a de-adhering coating on the core, the cohesion of the coating per se being less than the adhesion of said coating to the core and to the polyurethane.

* * * * *